United States Patent [19]

Rex

[11] Patent Number: 5,401,803
[45] Date of Patent: Mar. 28, 1995

[54] ETHYLENE-VINYL ACETATE COPOLYMER ADDITIVES FOR MOLDING COMPOSITIONS

[75] Inventor: Gary C. Rex, Cross Lanes, W. Va.

[73] Assignee: Union Carbide Chemicals & Plastics Technology Corporation, Danbury, Conn.

[21] Appl. No.: 172,553

[22] Filed: Dec. 23, 1993

[51] Int. Cl.⁶ .................. C08L 67/06; C08L 33/06
[52] U.S. Cl. ........................... 525/170; 525/302; 525/305
[58] Field of Search .................. 525/170, 302, 305

[56] References Cited

U.S. PATENT DOCUMENTS

| | | | |
|---|---|---|---|
| 3,665,057 | 5/1972 | Tanaka | 525/263 |
| 3,988,388 | 10/1976 | Alberts et al. | 260/862 |
| 4,206,155 | 6/1980 | Korber | 525/301 |
| 4,605,703 | 8/1986 | Fischer | 525/278 |
| 5,079,047 | 1/1992 | Bogaert | 525/301 |

FOREIGN PATENT DOCUMENTS

| | | |
|---|---|---|
| 1241983 | 10/1964 | Germany . |
| 2438718 | 2/1975 | Germany . |
| 37676 | 10/1976 | Japan . |

*Primary Examiner*—David Buttner
*Attorney, Agent, or Firm*—Warren K. Volles

[57] ABSTRACT

Additive compositions comprising ethylene-vinyl acetate copolymers suitable for use in molding compositions are disclosed. The ethylene-vinyl acetate copolymers have a low degree of crystallinity which can provide a desirable balance of pigmentability, shrinkage resistance and solubility in styrene when used in molding compositions containing the ethylene-vinyl acetate copolymers.

11 Claims, No Drawings

ETHYLENE-VINYL ACETATE COPOLYMER ADDITIVES FOR MOLDING COMPOSITIONS

FIELD OF THE INVENTION

The present invention relates to molding compositions and, more particularly, to improved ethylene-vinyl acetate copolymers useful as additives in the molding compositions.

BACKGROUND OF THE INVENTION

Wet mix molding processes are processes which utilize an unthickened, i.e., liquid molding composition. The molding composition is typically introduced into a mold which contains a substrate such as, for example, a fiberglass mat, and is molded, e.g., by compression molding, to produce a desired article.

Typical wet mix molding processes include, for example, pultrusion molding, preform molding and wet mat molding. Pultrusion molding involves pulling a substrate material through a bath containing the molding composition and then through suitable dies or fixtures which shape and cure the molding composition. Examples of molded articles produced by pultrusion, include, for example, plastic pipes, ladder rails, rods, and support beams such as I-beams. In preform molding, the molding composition is applied to a preformed substrate, usually fiberglass, having the shape of the desired article and cured in a heated matched die mold. Examples of molded articles produced by the preform process include, for example, automobile fenders and hoods, chairs and helmets. In wet mat molding, the molding composition is applied to a sheet of fiberglass mat, placed in a mold of a comparatively simpler geometry than a preform mold and cured. Examples of molded articles produced by wet mat processes include, for example, sheet stock for paneling, table tops and other articles of simple geometry.

Often, pigments are added to molding compositions in order to obtain a desired color in the final molded article. Two problems which are frequently encountered with pigmented molded articles are hazing, which is a lack of color depth, and mottling, which is non-uniform pigmentation.

Powdered polyethylene has been used as a shrink control additive in molding compositions in order to minimize hazing and mottling. However, polyethylene is not soluble in styrene, which is a common monomer used in molding compositions. This can lead to the filtering of polyethylene particles in the substrate materials, e.g., fiberglass, and an uneven distribution of the polyethylene throughout the mold. Moreover, polyethylene does not provide a high degree of shrinkage resistance in a molded part. As a result, molded articles with internally pigmented wet mix formulations which contain polyethylene often exhibit poor surface quality and warpage.

Poly(vinyl acetate) has been known to be an excellent shrink control additive for thermoset molding compositions, but generally has not been used as an additive in internally pigmented molding compositions because hazing and mottling can be severe. In addition, certain ethylene-vinyl acetate copolymers having a broad range of monomer content, e.g., from about 10 to 98 wt. % vinyl acetate, have also been proposed as additives in molding compositions. However, such ethylene-vinyl acetate copolymers have failed to provide a desirable balance of solubility in styrene, good pigmentation qualities, and good shrinkage resistance.

Accordingly, additive compositions comprising ethylene-vinyl acetate copolymers are desired which can provide good pigmentation qualities and shrink resistance as well as solubility in styrene. Improved molding compositions employing the ethylene-vinyl acetate copolymers as additives are also desired.

SUMMARY OF THE INVENTION

In accordance with the present invention additive compositions for use in molding compositions are provided. The additive compositions comprise an olefinically unsaturated monomer, such as, an unsaturated aromatic compound having from about 6 to 16 carbon atoms per molecule, e.g., styrene, and an ethylene-vinyl acetate copolymer. Quite surprisingly, it has been found that ethylene-vinyl acetate copolymers having a low degree of crystallinity can provide enhanced performance with respect to hazing and mottling in molding compositions as compared to ethylene-vinyl acetate copolymers having a higher degree of crystallinity. In addition, the additive compositions of the present invention can provide a high degree of solubility in styrene and good shrinkage resistance.

DETAILED DESCRIPTION OF THE INVENTION

The ethylene-vinyl acetate copolymers of the present invention are polymerized from ethylene and vinyl acetate monomers. The monomer concentration of vinyl acetate is typically from about 30 to 60 wt. %, preferably from about 35 to 50 wt. % more preferably, from about 40 to 50 wt. % and most preferably, from about 45 to 50 wt. % based on the weight of the ethylene-vinyl acetate copolymer, ethylene and vinyl acetate.

The ethylene-vinyl acetate copolymers have a low degree of crystallinity. In addition, the ethylene-vinyl acetate copolymers have a high degree of branching. Typically, the Branch Content will be greater than 10 and preferably greater than 15. As used herein, the term "Branch Content" means the moles of butyl branch per 1000 ethylene units. The Branch Content of an ethylene-vinyl acetate copolymer can be readily determined by integrating the area corresponding to butyl peaks from a carbon-13 nuclear magnetic resonance ($C_{13}$ NMR) spectrum of the ethylene-vinyl acetate copolymer. Such techniques are known to those skilled in the art and described for example in Randall; *JMS—Rev, Macromol. Chem. & Phys*, C29 (2+3), 303–317 (1989) and Wu; *J, Polym. Sci.*; Vol. 12; pp 901–911 (1974).

The molecular weight of the ethylene-vinyl acetate copolymers of the present invention typically ranges from about 5000 to 500,000 and preferably ranges from about 40,000 to 400,000 grams/gram mole. As used herein the term "molecular weight" means weight average molecular weight. Methods for determining the molecular weight of the ethylene-vinyl acetate copolymers of the present invention are known to those skilled in the art. One suitable method is low angle laser light scattering.

The melt index of the ethylene-vinyl acetate copolymers of the present invention can vary widely, e.g., from about 2 to 80, depending on various factors such as, for example, the vinyl acetate content, molecular weight and the crystallinity as well as perhaps other factors.

The ethylene-vinyl acetate copolymers of the present invention are commercially available. Alternatively, the details concerning the preparation of such copolymers are known to those skilled in the art.

One olefinically unsaturated monomer suitable for use in accordance with the present invention is selected from the group consisting of unsaturated aromatic compounds having from about 6 to 16 carbon atoms per molecule. Preferably, the unsaturated aromatic compounds have from about 8 to 12 carbon atoms per molecule. Specifically preferred unsaturated aromatic compounds include, for example, styrene, vinyl toluene, chlorostyrene, t-butylstyrene and divinylbenzene.

Another class of olefinically unsaturated monomer suitable for use in accordance with the present invention include acrylates and methacrylates having an acrylate functionality of from 1 to 5 acrylate groups per molecule. Typical acrylates and methacrylates include, for example, monomethyl methacrylate, trimethylol propane trimethacrylate, trimethylol propane triacrylate, pentaerythritol trimethacrylate, pentaerythritol acrylate, 1,6-hexane diol dimethacrylate, pentaerythritol tetraacrylate, pentaerythritol tetramethacrylate, ethoxylated or propoxylated derivatives thereof and mixtures thereof.

Still other olefinically unsaturated monomers suitable for use in accordance with the present invention include vinyl monomers, such as, for example, vinyl pyrrolidone and vinyl caprolactam, and acrylamides.

The olefinically unsaturated monomers of the present invention are commercially available. Alternatively, the details concerning the preparation of such monomers are known to those skilled in the art.

The additive compositions of the present invention comprise typically from about 20 to 50 wt. %, preferably from about 25 to 45 wt. and more preferably about 30 to 40 wt. % of the ethylene-vinyl acetate copolymer based on the weight of the additive composition. In addition, the additive compositions also comprise typically from about 50 to 80 wt. %, preferably from about 55 to 75 wt. % and more preferably about 60 to 70 wt. % of the olefinically unsaturated monomer. Mixtures of different olefinically unsaturated monomers and ethylene-vinyl acetate copolymers can also be employed within the above ranges.

The viscosity of the additive compositions of the present invention is typically from about 100 to 10,000 centipoise, preferably from about 200 to 7,000 centipoise, and more preferably from about 500 to 5,000 centipoise. As used herein, "viscosity" means the viscosity of a solution containing 30 wt. % of the ethylene-vinyl acetate copolymer in styrene measured at room temperature. Methods for measuring viscosity are known to those skilled in the art. Preferably, the additive compositions of the present invention have a viscosity which allows them to be readily pumpable and pourable.

The additive compositions of the present invention are particularly suitable for use for example, in molding compositions.

The molding compositions of the present invention comprise the above described additive compositions in addition to an unsaturated resin and an olefinically unsaturated monomer suitable for crosslinking with the unsaturated resin.

Typically, the unsaturated resin has an average molecular weight of at least 500, preferably from about 500 to 2000 grams per gram mole. The unsaturated resins can be any unsaturated resins, or mixtures thereof, known to those skilled in the art. Typical unsaturated resins include, for example, polyester resins, vinyl ester resins and acrylate resins.

The polyester resins are the reaction product of a polyol and at least one olefinically unsaturated dicarboxylic acid or anhydride, and may also include residues of saturated and/or aromatic dicarboxylic acids or anhydrides. Vinyl esters are the reaction products of saturated polyesters possessing secondary hydroxyl functionalities with vinyl group-containing acids or anhydrides such as acrylic acid or methacrylic acid. Typical acrylate resins include, for example, epoxy diacrylates, polyester diacrylates and polyurethane diacrylates. Unsaturated resins suitable for use in accordance with the present invention are described, for example, in the following references: B. Parkyn, F. Lamb, and B. V. Clifton, "Polyesters", Vol, II, London Iliffe Books, LTD, 1967; J. Bjorksten, H. Tovey, "*Polyesters and Their Applications*", Reinhold Publishing Corp., 1960; and U.S. Pat Nos. 5,166,291 and 4,942,001. Further details concerning the preparation of suitable unsaturated resins are known to those skilled in the art.

Preferably, the olefinically unsaturated monomer used in the molding composition is the same compound as the olefinically unsaturated monomer described above with respect to the additive compositions.

A typical molding composition in accordance with the present invention, will comprise from about 20 to 60 wt. % of the unsaturated resin, from about 5 to 60 wt. % of the olefinically unsaturated monomer and from about 1 to 40 wt. % of the ethylene-vinyl acetate copolymer of the present invention. The above percentages are based on the total weight of the unsaturated resin, the monomer, and the ethylene-vinyl acetate copolymer.

The molding compositions of the present invention may also contain one or more conventional additives such as, for example: an initiator, such as, for example, t-butyl perbenzoate, t-butyl peroctoate, and other peroxy esters, peroxy ketals and the like; fillers; mold release agents; rubbers and elastomers. Often, the molding compositions will also contain a pigment. The details concerning the selection and amounts of such ingredients are known to those skilled in the art.

The particular molding process used to mold articles using the compositions of the present invention is not critical. Preferably, the molding process is a wet mix molding process, e.g., pultrusion, wet mat molding, or preform molding, where the molding composition is applied to a substrate, e.g., fiberglass, and subjected to molding conditions to produce a desired molded article. Typical molding pressures range from about 100 to 1000 psia. Typical molding temperatures range from about 180° to 325° F. Further details concerning suitable molding processes are known to those skilled in the art.

Similarly, the particular molded articles produced with the compositions of the present invention are not critical. Typical articles, include for example, reinforced pipes, ladder rails, rods, support beams, such as I-beams, chairs, automobile fenders and hoods, helmets, battery cases, sheet stock for paneling, and the like.

The following examples are provided for illustrative purposes and are not intended to limit the scope of the claims which follow.

The following ingredients were used in the examples.

Elvax 40w—an ethylene-vinyl acetate copolymer containing 40 weight percent vinyl acetate available from DuPont, Wilmington, Del.

Elvax 150—an ethylene-vinyl acetate copolymer containing 33 percent vinyl acetate available from DuPont, Wilmington, Del.

Elvax 210—an ethylene-vinyl acetate copolymer containing 28 weight percent vinyl acetate available from DuPont, Wilmington, Del.

EY-902—an ethylene-vinyl acetate copolymer containing 41 weight percent vinyl acetate-available from Quantum Chemical, Cincinnati, Ohio.

EY-905—an ethylene-vinyl acetate copolymer containing 51 weight percent vinyl acetate available from Quantum Chemical, Cincinnati, Ohio.

Levapren 450—an ethylene-vinyl acetate copolymer containing 45 weight percent vinyl acetate available from Miles, Inc., Akron, Ohio.

Levapren 456—an ethylene-vinyl acetate copolymer containing 45 weight percent vinyl acetate available from Miles, Inc., Akron, Ohio.

Levapren 500HV—an ethylene-vinyl acetate copolymer containing 50 weight percent vinyl acetate available from Miles, Inc., Akron, Ohio.

Levapren 700 HV—an ethylene-vinyl acetate copolymer containing 70 weight percent vinyl acetate available from Miles, Inc., Akron, Ohio.

LP-40A—an acid-modified polyvinyl acetate polymer available from Union Carbide Corp., Danbury, Conn.

Microthene FN 510—a polyethylene polymer available from Quantum Chemical, Cincinnati, Ohio.

UE 647-35—an ethylene-vinyl acetate copolymer containing 28 weight percent vinyl acetate available from Quantum Chemical, Cincinnati, Ohio.

UE 654-35—an ethylene-vinyl acetate copolymer containing 33 weight percent vinyl acetate available from Quantum Chemical, Cincinnati, Ohio.

Polylite 31-602—orthophthalic-modified unsaturated polyester available from Reinhold Chemical, Research Triangle Park, N.C.

tBPB—tert-butyl perbenzoate available from Akzo Chemical, Chicago, Ill.

USP-245—2,5-dimethyl-2,5-bis-(2, ethyl hexoyl peroxy)hexane available from U.S. Peroxygen, Richmond Calif.

Modifier E—5 wt. % p-benzoquinone in diallyl phthalate available from Aristech Chemical, Pittsburgh, Pa.

CM-2015—35 wt. % carbon black pigment dispersion available from Plasticolors, Inc., Ashtabula, Ohio.

Zelec UN—phosphoric acid ester available from DuPont, Wilmington, Del.

Hubercarb W4—4 micron particle size calcium carbonate available from Huber Corp., St. Louis, Mo.

EXAMPLE 1

PREPARATION OF ADDITIVE COMPOSITIONS

A known amount of styrene was introduced into a mixing vessel of a Cowles blade mixer. The mixer was then turned on to a revolution per minute (RPM) level which created a slight vortex in the styrene liquid. Hydroquinone was then added to a concentration of 150 ppm to insure the stability of the styrene. Then one-half of the desired amount of the ethylene-vinyl acetate copolymer in particulate form was gradually added in order to avoid clumping of the particles. The slurry was mixed for 30 minutes and then the remaining portion of the copolymer were added and as the viscosity of the solution increased the mixer RPM was increased to maintain a slight vortex. The total amount of copolymer added was sufficient to provide an ethylene-vinyl acetate copolymer concentration of 30 wt. %. The mixing was continued for a total mix time of one hour.

The viscosity of the solution was measured for the compositions in which the ethylene-vinyl acetate copolymer was completely dissolved.

The melt index of the copolymers were measured using a Tinius Olsen Extrusion Plastometer according to the method described in ASTM D1238, condition E.

Table 1 below sets forth the vinyl acetate content, melt index and viscosity for various polymer samples.

TABLE 1
PHYSICAL PROPERTIES OF VARIOUS ETHYLENE-VINYL ACETATE COPOLYMERS

| Sample | Polymer | Wt % Vinyl Acetate | Melt Index (grams per 10 min.) | Viscosity 30% styrene sol. (centipoise) |
|---|---|---|---|---|
| 1-C | Microthene FN 510 | 0 | — | insoluble |
| 2 | Elvax 210 | 28 | — | styrene swollen pellets |
| 3 | UE 647-35 | 28 | 45.1 | very viscous mass, pellets visible |
| 4 | Elvax 150 | 33 | 40.8 | styrene swollen pellets |
| 5 | UE 654-35 | 33 | — | very viscous mass, pellets visible |
| 6 | Elvax 40w | 40 | 49.8 | 5,650 |
| 7 | EY-902 | 41 | 68.7 | 34,000 |
| 8 | Levapren 450 | 45 | 3.7 | 19,200 |
| 9 | Levapren 456 | 45 | 23.8 | 4,650 |
| 10 | EY-905 | 51 | 10.5 | 6,200 |
| 11 | Levapren 500 HV | 50 | 0.913 | 24,500 |
| 12 | Levapren 700 HV | 70 | 1.78 | 10,740 |
| 13-C | LP-40A | 100 | — | 5,000 |

Table 1 demonstrates that Sample 1-c, which was a polyethylene homopolymer, was insoluble in styrene. In addition, Samples 2 through 5 were only partially soluble in the styrene. Samples 2 through 5 contained from 28 to 33 wt. % vinyl acetate. Samples 6 through 13c were soluble in the styrene. Samples 13c was a vinyl acetate homopolymer.

EXAMPLE 2

PREPARATION OF MOLDING COMPOSITIONS

Molding compositions were prepared using the following procedure.

All the components, i.e., resins, activators, inhibitors, etc., were weighed individually into a 3.8 liter stainless steel beaker. The order of addition was; (1) polyester and thermoplastic solutions, (2) added styrene, if any, (3) initiators, (4) inhibitor, (5) pigment concentrate, (6) mold releases, and (7) calcium carbonate filler as shown in Table 2. However, after each addition of the above components, the mixture was high sheared for 1-2 minutes, except the filler addition was followed by high shearing for 3-4 minutes. The viscosity was measured using a model RVT Brookfield Synchro-Lectric Viscometer with Spindle#6 at 10 rpm.

Table 2 below sets forth the ingredients and concentrations thereof in the molding compositions. The concentrations are set forth in parts per 100 which is a common term in the molding industry. The concentration of the unsaturated resins a 60% solution of the resin in styrene was equal to 60 parts to provide a resin concentration of 36 parts. Similarly, the concentration of the ethylene-vinyl acetate copolymer as a 30% solution in styrene was 40 parts in order to provide a concentration of the copolymer equal to 12 parts. In the case of sample 1c and 13c, styrene was added in order to provide the appropriate concentration. The concentrations of all of the other ingredients listed are in parts per hundred based upon the 100 parts of resin copolymer and styrene described above. All of the formulas were compounded to give a viscosity of about 50,000 centipoises by adjusting the level of Hubercarb W4.

TABLE 2

| Components | Molding Compositions, Parts per hundred | | | | | | | | |
|---|---|---|---|---|---|---|---|---|---|
|  | 1 | 2 | 3 | 4 | 5 | 6 | 7 | 8 | 9 |
| Polylite 31-602[1] | 60 | 60 | 60 | 60 | 60 | 60 | 60 | 60 | 60 |
| Levapren 500 HV[2] | 40 | — | — | — | — | — | — | — | — |
| Levapren 700 HV[2] | — | 40 | — | — | — | — | — | — | — |
| Levapren 450[2] | — | — | 40 | — | — | — | — | — | — |
| Levapren 456[2] | — | — | — | 40 | — | — | — | — | — |
| Elvax 40w[2] | — | — | — | — | 40 | — | — | — | — |
| Microthene FN 510[3] | — | — | — | — | — | 12 | — | — | — |
| LP-40A[4] | — | — | — | — | — | — | 30 | — | — |
| styrene | — | — | — | — | — | 11 | 10 | — | — |
| EY-902[2] | — | — | — | — | — | — | — | 40 | — |
| EY-905[2] | — | — | — | — | — | — | — | — | 40 |
| tBPB | 1 | 1 | 1 | 1 | 1 | 1 | 1 | 1 | 1 |
| USP-245 | 0.5 | 0.5 | 0.5 | 0.5 | 0.5 | 0.5 | 0.5 | 0.5 | 0.5 |
| Modifier E | 0.4 | 0.4 | 0.4 | 0.4 | 0.4 | 0.4 | 0.4 | 0.4 | 0.4 |
| CM-2015 | 10 | 10 | 10 | 10 | 10 | 10 | 10 | 10 | 10 |
| Zinc Stearate | 3 | 3 | 3 | 3 | 3 | 3 | 3 | 3 | 3 |
| Zelec UN | 0.5 | 0.5 | 0.5 | 0.5 | 0.5 | 0.5 | 0.5 | 0.5 | 0.5 |
| Hubercarb W4 | 120 | 130 | 145 | 150 | 150 | 150 | 150 | 150 | 150 |

[1] 60 weight percent solution in styrene
[2] 30 weight percent solution in styrene
[3] particulate
[4] 40 weight percent solution in styrene

EXAMPLE 3

PREPARATION OF MOLDED ARTICLES AND TESTING

Apparatus and Process for Preparation of Molding Test Panels

Flat panels for surface, shrink control and pigmentation evaluations were molded on a 200-ton Lawton press containing a matched dye set of 18 inch × 18 inch chrome plated molds. The female cavity was installed in the bottom and the male portion was at the top. Both molds were hot oil heated and were controlled so that they could be operated at different temperatures. For the present molding, the top and bottom temperatures were 280°–290° F. 700 g samples of molding compound were employed with 2 plies of 1.5 oz./ft² swirl fiberglass mat and 1 ply of 10 mil veil/side, and the molded part thickness was 0.100 inch. The molding pressure, which can be varied from 0 to 1000 psig, was run at 500 psig. The panels were laid on a flat surface, weighted to keep them flat, and allowed to cool overnight.

Shrink Control Measurement

The molded panels were measured with a vernier caliper to an accuracy of 0.001 inch from corner to corner in all four directions to determine shrinkage, which is an average of the four readings. These panels contained 16% fiberglass by weight. These measurements were substituted into the equation below:

$$(b-a)/a = \text{inch/inch shrinkage}$$

where a = the sum of the lengths of the four sides of the mold, and b = the sum of the lengths of the four sides of the molded panels.

The shrink control measurement compares the perimeter of a cold panel to the perimeter of the cold mold. A reported positive number indicates an expansion and vice-versa for a reported negative number as compared to the cold mold. The units mil/inch indicate the amount of expansion (+) or contraction (−) in mils per inch of laminate (or panel perimeter). In accordance with the present invention the shrink control measurement is preferably less than ±1.0 inches and most preferably less than 0.6 inches.

Evaluation of Surface Smoothness

Surface quality measurements were performed on a Diffracto D-sight Audit Station-2 manufactured and sold by the Diffracto Co., Ltd. The surface waviness index (SWI) provided by this instrument is the standard deviation of the panel's surface with regard to long term waviness, as compared to the surface of a perfectly flat panel, whose long term waviness is zero. The smaller the SWI number, the smoother the panel.

Evaluation Of Pigmentability

The pigmentability of the molding compositions was determined by evaluating the panels qualitatively and quantitatively for haze and mottling, then assigning rating numbers. A mottling rating number of 1 means there was no pigment mottling present on the panel. A hazing rating of 1 means that hazing was minimal and the panel had a maximum depth of color. Ratings of 2, 3, 4 and 5 were considered to be good, fair, poor and very poor respectively. Hazing and mottling ratings of 2 or less are preferred. Laking was determined qualitatively. Laking can be described as the presence of regions on the surface of the panel which appear duller or less glossy than other regions.

The experimental molded panels were evaluated for surface quality, shrinkage control, laking, and pigmentability. Results are shown in Table 3 below.

TABLE 3

PIGMENTATION AND SURFACE QUALITY

| Property | MOLDED ARTICLE | | | | | | | | |
|---|---|---|---|---|---|---|---|---|---|
| | 1 | 2 | 3 | 4 | 5 | 6 | 7 | 8 | 9 |
| Mottling | 1 | 5 | 1 | 1 | 1 | 1 | 5 | 5 | 5 |
| Hazing | 2 | 5 | 2 | 2 | 2 | 1 | 5 | 3 | 3 |
| Laking | No | No | No | No | Yes | Yes | No | No | No |
| Surface Waviness Index | 30 | 26 | 50 | 45 | 23 | 230 | 23 | 53 | 44 |
| Shrink Control, mil/in | 0.569 | 0.014 | 0.541 | 0.305 | 0.111 | 1.804 | 0.018 | 0.250 | 0.333 |

Panels #2 and #7 show that copolymers with a vinyl acetate content at or above 70% gave very poor pigmentation and are not of acceptable commercial quality though shrink control and surface quality are excellent. On the other hand, the 100% polyethylene panel, #6, gave excellent pigmentation; however, the shrink control was very poor at −1.804 mils/inch as compared to the other panels. Quite Surprisingly, panels #1, #3, #4, and #5 gave good pigmentation coupled with the unique combination of excellent surface quality and shrink control. This defines preferred range of copolymers having a vinyl acetate content of about 40–50 wt. %, which gave good pigmentation and surface qualities. Because of the presence of laking on panel #5, it would appear that the most preferable range is 45–50% vinyl acetate.

Quite unexpectedly, panels #8 and #9 did not give good pigmentation performance though the additive used was in the preferred range of vinyl acetate content. It was suspected that there was a difference in polymer structure between the ethylene-vinyl acetate samples that gave an acceptable level of hazing and mottling and the ones that did not, i.e., EY-902 and 905.

EXAMPLE 4

NMR ANALYSIS

The copolymer samples were submitted for $C_{13}$ NMR analysis to ascertain whether or not there were any differences which may be attibutable to the performance differences.

Table 4 below shows the results of the NMR analysis.

TABLE 4

$C_{13}$ NMR ANALYSIS

| Polymer | ethylene (E) centered triad distribution ($EEE^1 + EEV^2 + VEV^3 = 1$) | | | Average ethylene sequence length | Branching Content (moles B per 1000 E units) B=butyl branch |
|---|---|---|---|---|---|
| | EEE | EEV + VE$E^4$ | VEV | | |
| Levapren 450 | 0.677 | 0.260 | 0.063 | 5.2 | 15.2 |
| Levapren 456 | 0.674 | 0.253 | 0.073 | 5.0 | 15.4 |
| Levapren 500 HV | 0.632 | 0.297 | 0.070 | 4.6 | 19.9 |
| Elvax 40W | 0.708 | 0.240 | 0.052 | 5.5 | 16.8 |
| EY-902 | 0.712 | 0.241 | 0.047 | 6.0 | 10.4 |
| EY-905 | 0.648 | 0.305 | 0.047 | 5.0 | 9.3 |

[1] EEE means the sequence ethylene, ethylene, ethylene.
[2] EEV means the sequence ethylene, ethylene, vinyl acetate.
[3] VEV means the sequence vinyl acetate, ethylene, vinyl acetate.
[4] VEE means the sequence vinyl acetate, ethylene, ethylene.

The branching content for each of the copolymers, using Levapren 450 as an example, was calculated as follows:

A C-13 solution NMR spectrum was generated for the copolymer sample on a QE-300 NMR Spectrometer (manufactured originally by General Electric) using the following experimental Electric) using the following experimental parameters: single pulse gated decoupling sequence, 11 s recycle delay, 30 1 pulse angle, 32K data points, and a spectral width of 210 ppm. The peaks in the NMR spectrum were assigned based on the paper by Wu, et. al., supra. The total area for all of the peaks from ethylene, methylenes of the butyl branch, and the methyl and methylene carbons of vinyl acetate occurring between about 20–45 ppm were integrated and set to 1000. The relative area of the peak from the $CH_3$ of the butyl branch occurring at about 14 ppm was then measured to be 6.10. The total relative area of the group of peaks occurring between about 68–76 ppm (from the methine carbon of vinyl acetate) were measured to be 89.55. This area was then multiplied by 2 to account for the two carbons (methyl and methylene) in vinyl acetate ($2 \times 89.55 = 179.1$) and subtracted from 1000 to yield the area from ethylene and methylenes of the butyl branch ($1000 - 179.1 = 820.9$). The area of the peak from the methyl of the butyl branch was then multiplied by 3 to account for the three methylene carbons in the butyl branch ($3 \times 6.10 = 18.3$) and subtracted from 820.9 to yield the area from ethylene ($820.9 - 18.3 = 802.6$). The ethylene area was then divided by two since there are two carbons in each mole of ethylene ($802.6/2 = 401.3$). The moles of butyl branch per 1000 moles of ethylene was then calculated (($6.10/401.3) \times 1000 = 15.2$).

The $C_{13}$ NMR data shown in Table 4 reveals that the ethylene centered triad distribution and the average ethylene sequence length for this set of copolymers are essentially the same. The slight differences in the E-centered triad distribution may be traced to the ethylene-vinyl acetate concentrations. The higher the ethylene content, the higher the EEE triad value. However, there is a significant difference in the Branching Contents of the copolymers. The EY-902 and EY-905 have 10.4 and 9.3 butyl branches per 1000 moles of ethylene, respectively. The remaining copolymers have greater than 10, e.g., greater than or equal to 15.2, butyl branches per 1000 moles of ethylene. The fewer number of branches in the EY-902 and EY-905 are believed to allow for the development of crystalline ethylene blocks. This claim is substantiated by the detection of a crystalline melt region in the range of 117°–118° C. in these polymers of lower branch content by Differential Scanning Calorimetry (DSC). The data is presented below in Table 5.

TABLE 5

| Mold. Comp. Ref. # | Prod. name | DSC Analysis of Pure EVAc polymers in 40–50% VAc Range | | | |
|---|---|---|---|---|---|
| | | Glass Transition | | Crystallinity | |
| | | Temp., deg. °C. | Heat Flow, W/g | Temp., deg. °C. | Heat, J/g |
| 4 | Levapren 456 | −17.9 | 0.205 | 47.3 | 4.1 |
| 5 | Elvax 40W | −14.3 | 0.184 | 50.5 | 17.4 |
| 1 | Levapren 500 | −8.9 | 0.193 | 42.7 | 6.8 |
| 8 | EY-902 | −16.1 | 0.198 | 47.2, 117.9 | 13.5, 1.3 |
| 9 | EY-905 | −16.8 | 0.193 | 46.6, 117.7 | 3.8, 1.4 |
| 3 | Levapren 450 | −15.6 | 0.219 | 45.7, 65.5 | 5.4, 0.3 |

The presence of crystalline blocks of ethylene is believed to contribute to the poorer pigmentation performance of the EY-902 and EY-905. Conversely, the absence of crystalline ethylene is believed to contribute to the superior performance of the more amorphous, more highly branched copolymers.

Although the present invention has been described with respect to specific aspects, those skilled in the art will recognize that other aspects are intended to be included within the scope of the claims which follow.

I claim:

1. In a molding composition comprising;
   (a) from about 20 to 60 weight percent of an unsaturated resin;
   (b) from about 5 to 60 weight percent of an olefinically unsaturated monomer copolymerizable with the unsaturated resin; and
   (c) from about 1 to 40 weight percent of an ethylene-vinyl acetate copolymer; said percentages based on the total weight of the unsaturated resin, the monomer and the ethylene-vinyl acetate copolymer: the improvement wherein the ethylene-vinyl acetate copolymer;
      (i) comprises from about 40 to 50 weight percent of vinyl acetate, based on the weight of the ethylene-vinyl acetate copolymer, and
      (ii) has a Branching Content of at least about 15.

2. The composition of claim 1 wherein the ethylene-vinyl acetate copolymer comprises from about 45 to 50 weight percent vinyl acetate, based on the weight of the ethylene-vinyl acetate copolymer.

3. A molded article prepared from the composition of claim 1.

4. The composition of claim 1 wherein the unsaturated resin is selected from the group consisting of polyester resins, vinyl ester resins and acrylate resins.

5. The composition of claim 1 wherein the olefinically unsaturated monomer is selected from the group consisting of unsaturated aromatic compounds having from about 6 to 12 carbon atoms per molecule.

6. The composition of claim 5 wherein the olefinically unsaturated monomer is selected from the group consisting of styrene, vinyl toluene, t-butyl styrene, chlorostyrene, and divinylbenzene.

7. The composition of claim 1 wherein the olefinically unsaturated monomer is selected from the group consisting of acrylates and methacrylates having an acrylate functionality of from about 1 to 5 acrylate groups per molecule.

8. The composition of claim 1 wherein the olefinically unsaturated monomer is a vinyl monomer.

9. The composition of claim 1 wherein the ethylene-vinyl acetate copolymer has a melt index of from about 2 to 80.

10. The composition of claim 1 wherein the ethylene-vinyl acetate copolymer has a molecular weight of from about 40,000 to 400,000 grams per gram mole.

11. In a molding composition comprising;
    (a) from about 20 to 60 weight percent of an unsaturated polyester resin;
    (b) from about 5 to 60 weight percent of styrene; and
    (c) from about 1 to 40 weight percent of an ethylene-vinyl acetate copolymer; said percentages based on the total weight of the unsaturated polyester resin, the styrene and the ethylene-vinyl acetate copolymer: the improvement wherein the ethylene-vinyl acetate copolymer;
       (i) comprises from about 40 to 50 weight percent of vinyl acetate, based on the weight of the ethylene-vinyl acetate copolymer, and
       (ii) has a Branching Content of at least about 15.

* * * * *